(12) United States Patent
Jung et al.

(10) Patent No.: US 9,312,700 B2
(45) Date of Patent: Apr. 12, 2016

(54) WIRELESS POWER TRANSMISSION APPARATUS

(75) Inventors: Chun-Kil Jung, Seoul (KR); Soo-Dong Shon, Gyeonggi-do (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 871 days.

(21) Appl. No.: 13/357,759

(22) Filed: Jan. 25, 2012

(65) Prior Publication Data
US 2013/0169057 A1    Jul. 4, 2013

(30) Foreign Application Priority Data
Dec. 28, 2011 (KR) .......................... 10-2011-0144245

(51) Int. Cl.
| | |
|---|---|
| *H02J 17/00* | (2006.01) |
| *H02J 5/00* | (2006.01) |
| *H02J 7/02* | (2006.01) |
| *H02J 7/00* | (2006.01) |

(52) U.S. Cl.
CPC ................. *H02J 5/005* (2013.01); *H02J 7/025* (2013.01); *H02J 7/0027* (2013.01); *H02J 7/0042* (2013.01); *H02J 7/0044* (2013.01)

(58) Field of Classification Search
CPC ......... H02J 5/005; H02J 7/0027; H02J 7/025; H02J 7/0044; H02J 7/0042
USPC .................. 307/104; 320/107–115; D13/102, D13/107–110, 117–119, 184, 251, 253, 432, D13/434
See application file for complete search history.

(56) References Cited

U.S. PATENT DOCUMENTS

| | | | |
|---|---|---|---|
| 8,378,524 B2 * | 2/2013 | Mita ............................. | 307/104 |
| 2010/0052431 A1 * | 3/2010 | Mita ............................. | 307/104 |
| 2011/0018360 A1 * | 1/2011 | Baarman et al. .............. | 307/104 |

* cited by examiner

*Primary Examiner* — Rexford Barnie
*Assistant Examiner* — Elim Ortiz
(74) *Attorney, Agent, or Firm* — Stein IP, LLC

(57) ABSTRACT

Provided is a wireless power transmission apparatus for wirelessly transmitting the power to portable electronic appliances using power or batteries charging power and supplying operation power to the portable electronic appliances. The wireless power transmission apparatus includes first and second source resonators, which are included inside a plurality of resonator bodies and which generates and wirelessly transmits the resonant power to a target resonator. The resonator bodies are formed to be folded to each other on an axis of a hinge.

4 Claims, 6 Drawing Sheets

WIRELESS POWER TRANSMISSION APPARATUS

RELATED APPLICATIONS

This application claims priority to Korean Patent Application No. 10-2011-0144245, filed on Dec. 28, 2011, which is incorporated herein by reference in its entirety.

BACKGROUND

1. Field

The following description relates to a wireless power transmission apparatus for wirelessly transmitting the power to portable electronic appliances using the power or batteries charging power to supply the operation power to the portable electronic appliances.

2. Description of the Related Art

As information technology develops, diverse portable electronic appliances have been launched and their supply continuously increases. Due to the nature of the portable electronic appliances, the performance of the battery installed on the portable electronic appliances came to the fore as an important issue.

Generally, functions for wirelessly transmitting data are provided to home appliances as well as the portable electronic appliances.

However, since the power is supplied through a power line, the power line as a required element causes inconvenience to the user.

Recently, the wireless power transmission technology for wirelessly supplying the power at a short range without connection of the power line has been much studied.

However, since most wireless power transmission technologies use only one source resonator formed of a 2-dimensional structure, there is a large directional limitation.

SUMMARY

An embodiment of the present document is directed to providing a wireless power transmission apparatus for effectively transmitting the wireless power to a target resonator using a pair of source resonators.

Another embodiment of the present document is directed to providing a wireless power transmission apparatus for reducing a directional limitation by using a pair of source resonators.

Still another embodiment of the present document is directed to providing a wireless power transmission apparatus for improving power transmission efficiency through a rotating magnetic field generating around the target resonator when a pair of source resonators alternatively generates resonant power through the power alternatively supplied to the pair of source resonators.

The problems to be solved by the present document is not limited to the technical problems mentioned above, and other technical problems, which are not mentioned above, may be apparently understood by those skilled in the art based on the description below.

To achieve the embodiment of the present document, provided is an wireless power transmission apparatus including: first and second resonator bodies, which are folded to each other on an axis of a hinge; and first and second source resonators included inside the first and second resonator bodies to generate resonant power according to power of a predetermined frequency, which is supplied by a resonant controller, and to wirelessly transmit power to a target resonator of wireless power reception apparatuses.

The wireless power transmission apparatus may further includes: a controller body, which includes the resonant controller inside, and which is combined with the first and second resonator bodies to be folded to each other by the hinge.

The resonant controller alternatively supplies power of a predetermined frequency to the first and second source resonators.

The first and second source resonators respectively include: source coils, which are included inside the first and second resonator bodies, and to which power of a predetermined frequency is applied; and resonant coils, which are included inside the first and second resonator bodies, and which generate resonant power by induction of power of a predetermined frequency applied to the source coil and resonate.

To achieve another embodiment of the present document, provided is a wireless power transmission apparatus, including: a first resonator body installed on an end portion of a vertical prop to be rotatable; a second resonator body installed on a center of the first resonator body in an orthogonal direction to the first resonator body; and first and second source resonators, which are respectively included inside the first resonator body and the second resonator body, and which transmit resonant power by resonating by power of a predetermined frequency supplied by a resonant controller.

The resonant controller alternatively supplies power of a predetermined frequency to the first and second source resonators.

The first and second source resonators respectively includes: resonant coils, which are respectively included inside the first and second resonator bodies, and to which power of a predetermined frequency is applied; and resonant coils, which are respectively included inside the first and second resonator bodies, and generate resonant power by induction of power of a predetermined frequency applied to the resonant coil and resonate.

To achieve another embodiment of the present document, provided is a wireless power transmission apparatus, including: a slider which is installed on a vertical prop to be lifted up and down, and which includes a plurality of horizontal props; a plurality of resonator bodies, which are respectively installed on the horizontal props to be movable; and a plurality of source resonators, which are respectively included in the resonator bodies, and which transmit resonant power by resonating by power of a predetermined frequency supplied by a resonant controller.

In the slider, first to fourth resonator bodies are installed on four horizontal props included in a vertical direction.

The resonant controller supplies power of a predetermined frequency to two source resonators, which are disposed orthogonally to each other, among the source resonators included in the first to fourth resonator bodies, and operates two source resonators, which do not receive power, by a repeater.

The source resonators respectively include: source coils, to which the power of a predetermined frequency is applied; and resonant coils for generating resonant power while resonating by inducting of the power applied to the source coil.

BRIEF DESCRIPTION OF THE DRAWINGS

Hereinafter, the present document will be described in detail through the exemplary embodiments, which do not limit the scope of the present document, with reference to the accompanying drawings. In some embodiments of this specification, the same constituent elements have the same reference numeral.

DETAILED DESCRIPTION

The following detailed description will be provided only for the purpose of exemplary embodiments according to the present document. Also, the principle and concept of the present document are provided for useful and easy description.

Accordingly, unnecessarily detailed configurations for basic understanding of the present document are not provided herein. Diverse embodiments, which may be realized according to the present document by those skilled in the art, are exemplified through accompanying drawings.

Figure 1:
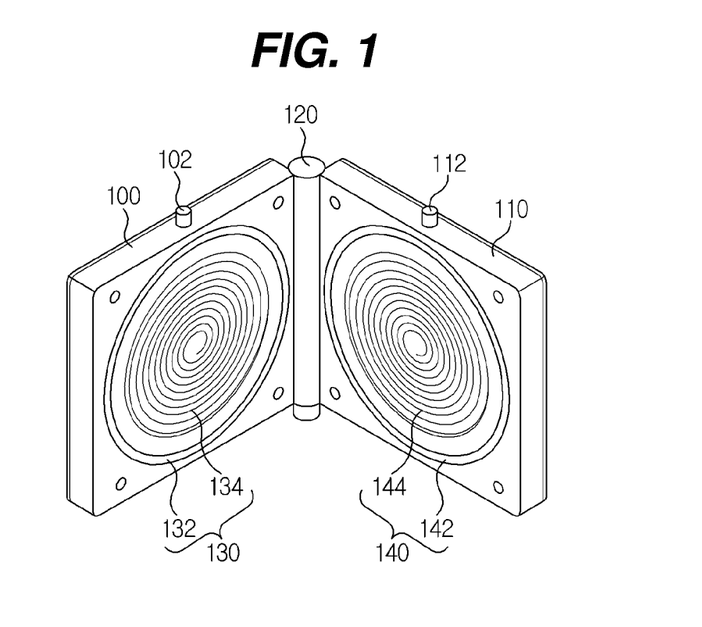
FIG. 1 is a perspective view showing a wireless power transmission apparatus in accordance with an exemplary embodiment.

FIG. 1 is a perspective view showing a wireless power transmission apparatus in accordance with an exemplary embodiment. In FIG. 1, reference numerals 100 and 110 respectively represent first and second resonator bodies. The first and second resonator bodies 100 and 110 are installed to be folded to each other by a hinge 120.

As shown in FIG. 1, the first and second resonator bodies 100 and 110 include connectors 102 and 112 for receiving power from outside on a proper location of a top surface, e.g. on a center of the top surface. First and second source resonators 130 and 140 for transmitting the power are respectively included inside the first and second resonator bodies 100 and 110.

Each of the first and second source resonators 130 and 140 includes source coils 132 and 142, and resonant coils 134 and 144. The power supplied through the connectors 102 and 112 is applied to the source coils 132 and 142. The source coils 134 and 144 are disposed at the inner side of the source coils 132 and 142 and generate the resonant power while resonating by induction of power applied to the source coils 132 and 142.

Figure 2:
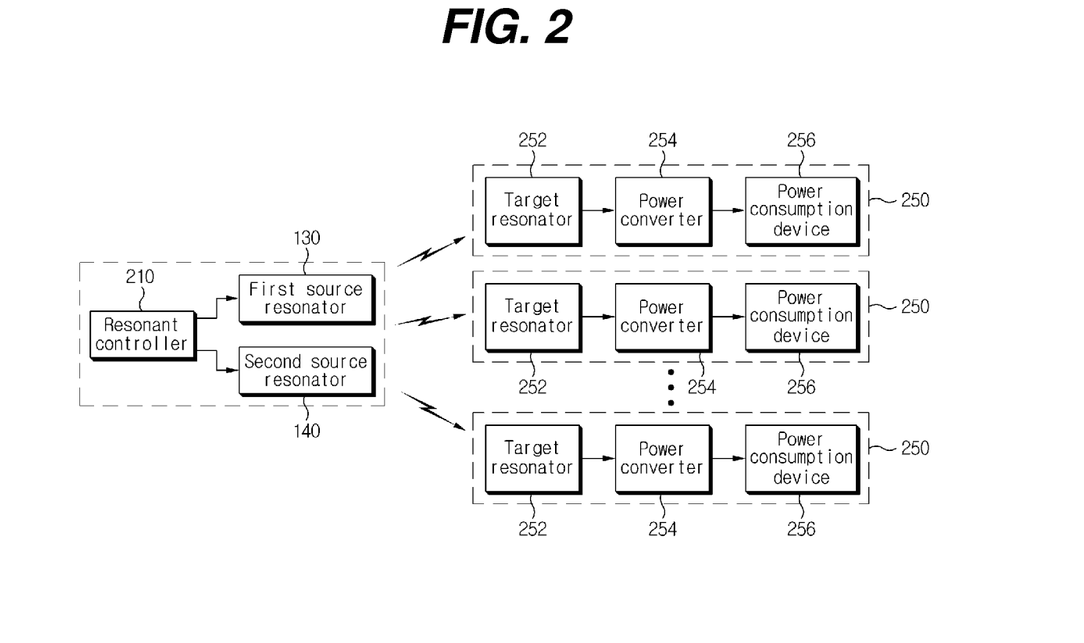
FIG. 2 is a block diagram showing a configuration of the wireless power transmission apparatus and a wireless power reception apparatus in accordance with an exemplary embodiment.

FIG. 2 is a block diagram showing a configuration of the wireless power transmission apparatus and a wireless power reception apparatus in accordance with an exemplary embodiment.

A reference numeral 200 represents the wireless power transmission apparatus according to an exemplary embodiment. The wireless power transmission apparatus 200 may include the above-mentioned first and second source resonators 130 and 140 and a resonant controller 210.

The resonant controller 210 supplies the power to the source coils 132 and 142 of the first and second source resonators 130 and 140.

A reference numeral 250 represents the plurality of wireless power reception apparatuses. The wireless power reception apparatuses 250 may respectively include a target resonator 252, a power converter 254 and a power consumption device 256.

The target resonator 252 receives resonant power that is wirelessly transmitted from the first and second source resonators 130 and 140 of the wireless power transmission apparatus 200.

The resonant power received in the target resonator 252 is input to the power converter 254, and converted into the certain level of the power that may be used in the power consumption device 256. The converted power is supplied to be used in the power consumption device 256.

Examples of the power consumption device 256 may include portable electronic appliances such as a laptop computer a portable terminal, and batteries for charging power and supplying operation power to the portable electronic appliances.

When the power is wirelessly transmitted to the wireless power transmission apparatus 200 having the above-mentioned configuration, the user rotates the first and second resonator bodies 100 and 110 on an axis of the hinge 120, broaden the first and second resonator bodies 100 and 110 at a predetermined angle, and disposes the first and second resonator bodies 100 and 110 at a location where the power is transmitted to the wireless power reception apparatuses 250.

The connectors 102 and 112, which are respectively included in the resonant controller 210 and the first and second resonator bodies 100 and 110, are electronically connected through a predetermined cable (not shown).

In such a state, the resonant controller 210 generates the power of a predetermined frequency, and the generated power is applied to the source coils 132 and 142 of the first and second source resonators 130 and 140 through a cable and the connectors 102 and 112.

The power applied to the source coils 132 and 142 is induced by the resonant coils 134 and 144 and resonates to generate resonant power. The generated resonant power is transmitted to the target resonator 252 of the plurality of the wireless power reception apparatuses 250.

The resonant controller 210 alternatively supplies the power of a predetermined frequency to the source coils 132 and 142 of the first and second source resonators 130 and 140.

Therefore, the first source resonator 210 and the second source resonator 310 alternatively generate the resonant power and the alternatively generated resonant power is transmitted to the target resonator 252 so that the rotating magnetic field may be generated around the target resonator 252.

The target resonator 252 is resonated by the rotating magnetic field to receive the resonant power. The received resonant power is converted into the certain level of the power to supply to the power consumption device 256 so that the power consumption device 256 may use it in the power converter 254.

Figure 3:
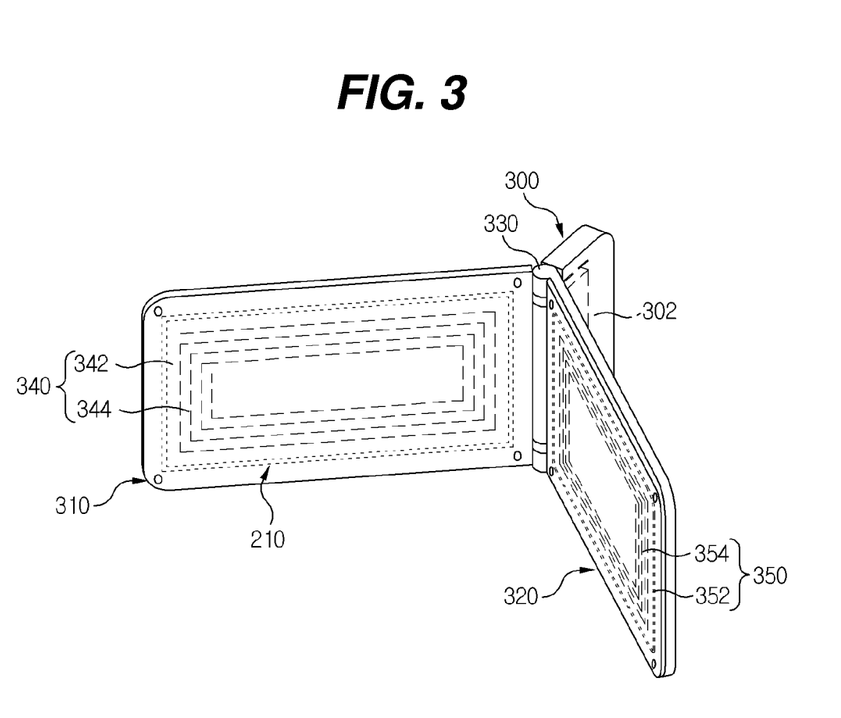
FIG. 3 is a perspective view showing the wireless power transmission apparatus in accordance with another exemplary embodiment.
Figure 4:
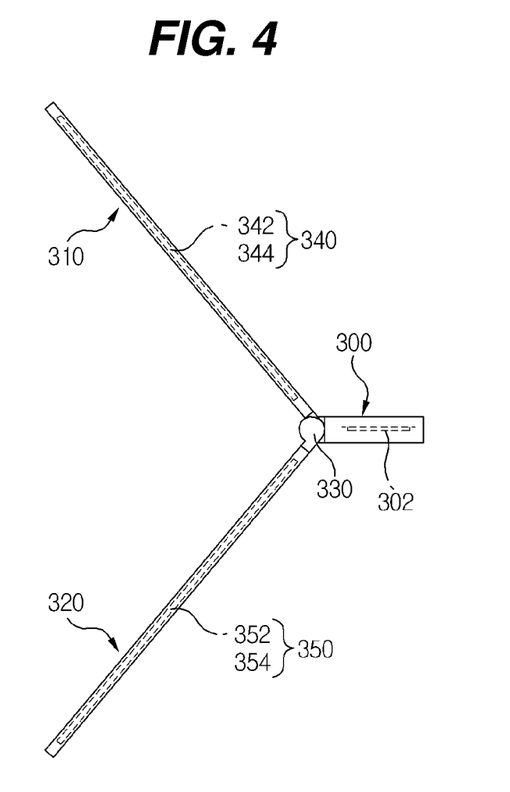
FIG. 4 is a plan view showing the wireless power transmission apparatus in accordance with another exemplary embodiment.

FIG. 3 is a perspective view showing the wireless power transmission apparatus in accordance with another exemplary embodiment. FIG. 4 is a plan view showing the wireless power transmission apparatus in accordance with another exemplary embodiment.

A reference numeral 300 represents a controller body 300. A resonant controller 302 with predetermined constituent elements is installed on a circuit board inside the controller body 300.

Reference numerals 310 and 320 represent first and second resonator bodies. The first and second resonator bodies 310 and 320 are installed on the controller body 300 to be folded by a hinge 330. A first source resonator 340 and a second source resonator 350 are respectively installed inside the first and second resonator bodies 310 and 320.

The first and second source resonators 340 and 350 respectively include rectangular source coils 342 and 352 having a round edge, and resonant coils 344 and 354 having a rectangular ring shape. The resonant coils 344 and 354 are disposed inside the source coils 342 and 352 and resonated by power applied to the source coils 342 and 352 to radiate the resonant power.

According to another exemplary embodiment of the present document having the above-mentioned configuration, the first and second resonator bodies 310 and 320 are rotated and broaden on an axis of the hinge 330 when the power is transmitted to the plurality of target resonators 252.

Since the controller body 300 forms a triangle with the first and second resonator bodies 100 and 110 when installed, more stable installation than the above-mentioned exemplary embodiment is possible.

In such a state, the resonant controller 302 inside the controller body 300 generates the power of a predetermined frequency. The generated power is alternatively applied to each of the source coils 342 and 352 of the first and second source resonators 340 and 350 included in the first and second resonator bodies 310 and 320.

The power alternatively applied to the source coils 342 and 352 of the first and second source resonators 340 and 350 is induced by the resonant coils 344 and 354. The resonant coils 344 and 354 are resonated to alternatively generate resonant power. The alternatively generated resonant power is transmitted to the target resonator 252 of the wireless power reception apparatuses 250 to form a rotating magnetic field around the target resonator 252. The target resonator 252 is resonated by the rotating magnetic field to receive the resonant power.

Figure 5:
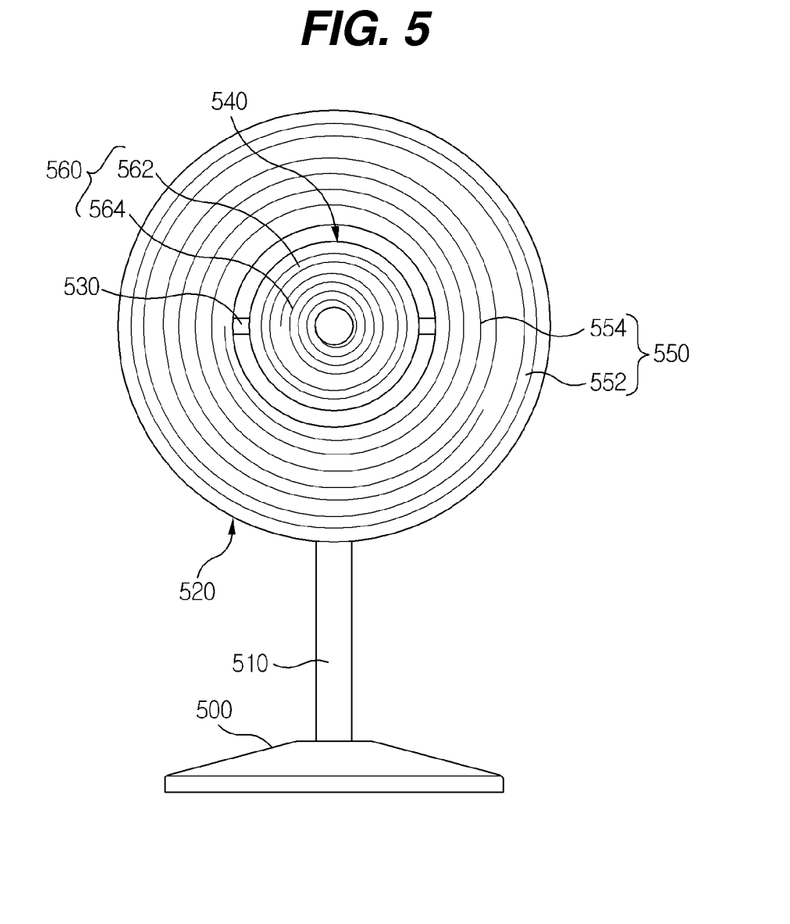
FIG. 5 is a front view showing the wireless power transmission apparatus in accordance with still another exemplary embodiment.

FIG. 5 is a front view showing the wireless power transmission apparatus in accordance with still another exemplary embodiment. A reference numeral 500 represents a supporter and a reference numeral 510 represents a vertical prop which is vertically installed on the supporter 500. A ring-shaped first resonator body 520 is installed on a top of the vertical prop 510 to be rotatable. A second resonator body 540 is installed on a center of a ring-shaped first resonator body 520 to be rotatable on an axis of a rotational axis 530.

First and second source resonators 550 and 560 are respectively included at an inner side of the first and second resonator bodies 520 and 540.

The first and second source resonators 550 and 560 respectively include source coils 552 and 562, and resonant coils 554 and 564. The Power output from the resonant controller 210 is applied to the source coils 552 and 562. The resonant coils 554 and 564 are resonated by induction of the power applied to the source coils 552 and 562.

According to another exemplary embodiment of the present document having the above-mentioned configuration, the supporter 500 is installed on a proper location for transmitting the power when the power is transmitted to the target resonator 252.

In such a state, the user rotates the first resonator body 520 at a predetermined angle on a center of the vertical prop 510 in a direction of the installation location of the target resonator 252 and rotates the second resonator body 540 at a predetermined angle on a center of the rotational axis 530.

An external resonant controller applies the power of a predetermined frequency to the source coils 552 and 562 of the first and second source resonators 550 and 560 inside the first and second resonator bodies 520 and 540.

Subsequently, the power applied to the source coils 552 and 562 is induced to the resonant coils 554 and 564 to generate resonant power while resonance is generated. The generated resonant power is transmitted to the target resonator 252.

According to still another exemplary embodiment of the present document having the above-mentioned configuration, the resonant controller alternatively supplies power of a predetermined frequency to the source coils 552 and 562 of the first source resonator 550 and second source resonator 560.

The resonant coils 554 and 564 alternatively generate the resonant power by the alternating power, which is alternatively applied to the source coils 552 and 562. The alternatively generated resonant power is transmitted to the target resonator 252 and the rotating magnetic field is generated around the target resonator 252. The target resonator 252 resonates in a rotational direction of the rotating magnetic field to receive resonant power.

Figure 6:
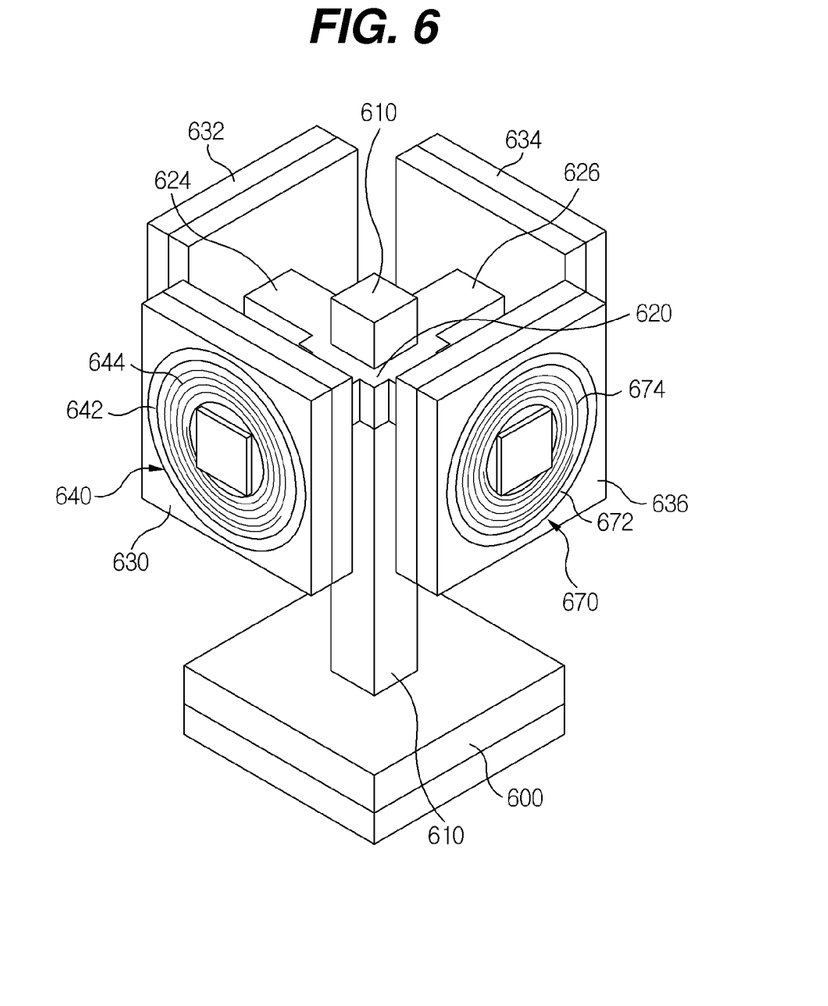
FIG. 6 is a perspective view showing the wireless power transmission apparatus in accordance with still another exemplary embodiment.
Figure 7:
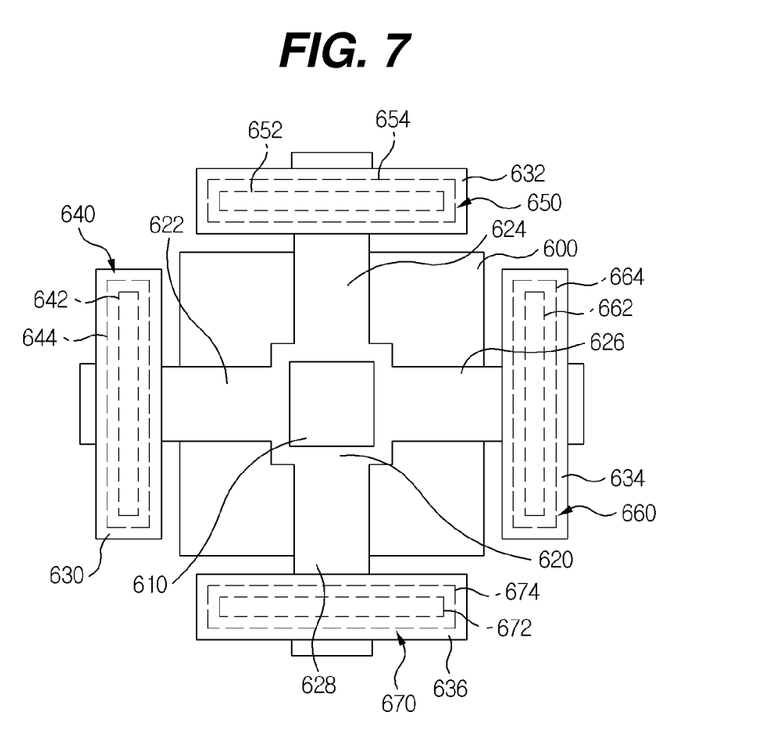
FIG. 7 is a plan view showing the wireless power transmission apparatus in accordance with still another exemplary embodiment.

FIG. 6 is a perspective view showing the wireless power transmission apparatus in accordance with still another exemplary embodiment. FIG. 7 is a plan view showing the wireless power transmission apparatus in accordance with still another exemplary embodiment.

A reference numeral 600 represents a supporter. A reference numeral 610 represents a vertical prop having a rectangular section, which is vertically installed on a center of the supporter 600.

A slider 620 going up and down is installed on the vertical prop 610. Four horizontal props 622, 624, 626 and 628 are orthogonally formed to one another on the slider 620.

First to fourth resonator bodies 630, 632, 634 and 636 are installed to horizontally slide on each of the four horizontal props 622, 624, 626 and 628. First to fourth source resonators 640, 650, 660 and 670 are included inside each of the first to fourth resonator bodies 630, 632, 634 and 636.

The first to fourth source resonators 640, 650, 660 and 670 respectively include source coils 642, 652, 662 and 672, and resonant coils 644, 654, 664 and 674. The power of a predetermined frequency supplied by the resonant controller is applied to the source coils 642, 652, 662 and 672. The resonant coils 644, 654, 664 and 674 are disposed outside the source coils 642, 652, 662 and 672, and generate resonant power while resonance is generated by induction of the power applied to the source coils 642, 652, 662 and 672.

According to still another exemplary embodiment of the wireless power transmission apparatus having the above-mentioned configuration, the slider 620 is lifted up and down in the vertical prop 610 in transmitting power to control the height of the first to fourth resonator bodies 630, 632, 634 and 636. The first to fourth resonator bodies 630, 632, 634 and 636 are moved to be located at an end portion of the horizontal props 622, 624, 626 and 628.

The power of a predetermined frequency supplied by the resonant controller is applied to two source coils, which are disposed orthogonally to each other, among the source coils 642, 652, 662 and 672 of the first to fourth source resonators 640, 650, 660 and 670 included in each of the first to fourth resonator bodies 630, 632, 634 and 636.

For example, in order to apply the power to the source coil 642, power may be applied to the source coil 672 or the source coil 652, which is disposed in a vertical direction to the source coil 642, but the power may not be applied to the source coil 662, which is disposed to face the source coil 642.

The present document assumes that power is applied to the source coils 642 and 652, which are disposed vertically to each other.

When the power is applied to the source coils 642 and 652, the applied power is induced to the resonant coils 644 and 654 to generate resonant and resonant power. The generated resonant power is externally radiated. The third and fourth source resonators 660 and 670, which are disposed to face the first and second source resonators 640 and 650, are operated by a repeater. The resonant power radiated from the first and second source resonators 640 and 650 is repeated by the third and fourth source resonators 660 and 670 and transmitted in all directions.

The wireless power transmission apparatus transmits the power to the target resonator by alternatively generating resonant power by a pair of source resonators. Since the rotating magnetic field is generated around the target resonator, a directional limitation is reduced and the power transmission efficiency may be improved.

While the present document has been described with respect to the specific exemplary embodiments, it will be apparent to those skilled in the art that various changes and modifications to the exemplary embodiments may be made without departing from the spirit and scope of the document.

Accordingly, the scope of the present document should not be limited to the above-mentioned exemplary embodiment but any equivalency or equivalent modifications of claims, as well as claims themselves described here-in-below are intended to fall under the scope of the idea of the document.

What is claimed is:

1. An wireless power transmission apparatus transmitting a resonant power in a magnetic resonance, comprising:
   a first source resonator body;
   a second source resonator body;
   a hinge making the first source resonator body and the second source resonator body be rotated so that the first source resonator body and the second source resonator body face a less power receiving device;
   first and second resonator bodies that are foldable with respect to one another on an axis of a hinge; and
   first and second source resonators configured to wirelessly transmit power to a target resonator of a wireless power reception apparatus, wherein the first and second source resonators are disposed inside the first and second resonator bodies, respectively, and configured to generate a resonant power according to a power of a predetermined frequency, which is supplied by a resonant controller, wherein the resonant controller alternatively supplies the power of the predetermined frequency to the first and the second resonator, to form a rotating magnetic field around the target resonator so that the target resonator can resonates in a rotational direction of the rotating magnetic field to receive the resonant power,
   wherein the resonant controller alternatively supplies the power of the predetermined frequency to the first and the second resonators, to form a rotating magnetic field around the target resonator so that the target resonator can resonates in a rotational direction of the rotating magnetic field to receive the resonant power.

2. The wireless power transmission apparatus of claim 1, further comprising:
   a controller body encasing the resonant controller and being configured to engage the first and second resonator bodies to enable the first and second resonator bodies to be foldable with respect to each other by the hinge.

3. The wireless power transmission apparatus of claim 1, wherein the resonant controller alternatively supplies the power of the predetermined frequency to the first and second source resonators.

4. The wireless power transmission apparatus of claim 1, wherein the first and second source resonators respectively comprise:
   source coils, which are included inside the first and second resonator bodies, respectively, and to which the power of the predetermined frequency is applied; and
   resonant coils, which are included inside the first and second resonator bodies, respectively, and which generate the resonant power by induction of the power of the predetermined frequency applied to the source coils and resonate.

* * * * *